US012609071B2

(12) United States Patent
Wang

(10) Patent No.: US 12,609,071 B2
(45) Date of Patent: Apr. 21, 2026

(54) DISPLAY PANEL, DRIVING METHOD, AND DISPLAY DEVICE

(71) Applicants: Wuhan Tianma Micro-Electronics Co., Ltd., Wuhan (CN); Wuhan Tianma MicroElectronics Co., Ltd. Shanghai Branch, Shanghai (CN)

(72) Inventor: Yaolin Wang, Wuhan (CN)

(73) Assignees: Wuhan Tianma Micro-Electronics Co., Ltd., Wuhan (CN); Wuhan Tianma Micro Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/214,328

(22) Filed: Jun. 26, 2023

(65) Prior Publication Data

US 2024/0346980 A1 Oct. 17, 2024

(30) Foreign Application Priority Data

Apr. 11, 2023 (CN) ......................... 202310383779.9

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/062* (2013.01); *G09G 2320/0214* (2013.01); *G09G 2320/0252* (2013.01)

(58) Field of Classification Search
CPC ......... G09G 3/3266; G09G 2310/0286; G09G 3/3233; G09G 2310/062
See application file for complete search history.

(56) References Cited

U.S. PATENT DOCUMENTS

| | | | | |
|---|---|---|---|---|
| 11,004,385 B1 * | 5/2021 | Li | G09G 3/3233 |
| 2013/0127924 A1 * | 5/2013 | Lee | G09G 3/2025 345/82 |
| 2018/0374417 A1 * | 12/2018 | Yang | G09G 3/3233 |
| 2019/0355302 A1 * | 11/2019 | Ding | G09G 3/3275 |
| 2022/0139337 A1 * | 5/2022 | Zhao | G09G 3/3233 345/76 |
| 2022/0180810 A1 * | 6/2022 | Zhang | G09G 3/3233 |

(Continued)

FOREIGN PATENT DOCUMENTS

| | | |
|---|---|---|
| CN | 105096838 A | 11/2015 |
| CN | 106023895 A | 10/2016 |

(Continued)

*Primary Examiner* — Bipin Gyawali
(74) *Attorney, Agent, or Firm* — Anova Law Group, PLLC

(57) ABSTRACT

A display panel and a display device are provided. The display panel includes a pixel driving circuit, a scan line, and a light-emitting control line connected to the pixel driving circuit. The pixel driving circuit includes a driving transistor, a first reset module, and a light-emitting element. An output terminal of the first reset module is connected to a gate of the driving transistor and an output terminal of the driving transistor is electrically connected to the light-emitting element. An input terminal of the first reset module is connected to the scan line or the light-emitting control line. A scan signal provided by the scan line or a light-emitting control signal provided by the light-emitting control line is multiplexed as a first reset signal provided by the reset module to the gate of the driving transistor.

8 Claims, 11 Drawing Sheets

200

(56) References Cited

U.S. PATENT DOCUMENTS

| | | | | |
|---|---|---|---|---|
| 2022/0230592 | A1* | 7/2022 | Zhao | G09G 3/3258 |
| 2023/0274692 | A1* | 8/2023 | Su | G09G 3/32<br>345/55 |
| 2024/0005858 | A1* | 1/2024 | Zhang | G09G 3/3233 |
| 2024/0021159 | A1* | 1/2024 | Wang | G09G 3/3258 |
| 2024/0177664 | A1* | 5/2024 | Wang | G09G 3/3266 |
| 2024/0177672 | A1* | 5/2024 | Zhang | G09G 3/3233 |
| 2024/0221595 | A1* | 7/2024 | Hwang | H10K 59/1213 |
| 2025/0148960 | A1* | 5/2025 | Zhong | G09G 3/2081 |
| 2025/0148975 | A1* | 5/2025 | Zhao | G09G 3/3233 |

FOREIGN PATENT DOCUMENTS

| | | | | | |
|---|---|---|---|---|---|
| CN | 107170408 | A | | 9/2017 | |
| CN | 111916027 | A | | 11/2020 | |
| CN | 114913815 | A | * | 8/2022 | G09G 3/3208 |

* cited by examiner

DISPLAY PANEL, DRIVING METHOD, AND DISPLAY DEVICE

CROSS-REFERENCE TO RELATED APPLICATION

This application claims the priority of Chinese Patent Application No. 202310383779.9, filed on Apr. 11, 2023, the content of which is incorporated herein by reference in its entirety.

TECHNICAL FIELD

The present disclosure generally relates to the field of display technology and, more particularly, relates to a display panel, a driving method, and a display device.

BACKGROUND

From the era of cathode ray tube (CRT) to the era of liquid crystal display (LCD), and now to the era of organic light-emitting diode (OLED) and light-emitting diode display, the display industry has evolved significantly after decades of development. The display industry has been closely related to our lives. From traditional mobile phones, tablets, TVs, and PCs, to the current smart wearable devices, VR, vehicle displays and other electronic devices, display technology is inseparable.

For display panels of the same size, when one display panel has a higher resolution, the number of pixels and pixel driving circuits is higher. However, since the display area is constant, the size of the pixel driving circuits needs to be further reduced. The pixel driving circuits include many devices, and the space for wiring is further reduced. Too tight wiring may cause leakage, crosstalk, and other problems.

SUMMARY

One aspect of the present disclosure provides a display panel. The display panel includes a pixel driving circuit, a scan line, and a light-emitting control line connected to the pixel driving circuit. The pixel driving circuit includes a driving transistor, a first reset module, and a light-emitting element. An output terminal of the first reset module is connected to a gate of the driving transistor and an output terminal of the driving transistor is electrically connected to the light-emitting element. An input terminal of the first reset module is connected to the scan line or the light-emitting control line. A scan signal provided by the scan line or a light-emitting control signal provided by the light-emitting control line is multiplexed as a first reset signal provided by the reset module to the gate of the driving transistor.

Another aspect of the present disclosure provides a driving method for driving a pixel driving circuit. The pixel driving circuit includes a driving transistor, a power supply voltage writing module, a data writing module, a compensation module, a light-emitting control module, a first reset module, a second reset module, and a light-emitting element. The driving method at least includes a reset stage, a data writing stage, and a light-emitting stage. In the reset phase, the first reset module and the second reset module are turned on, the first reset module transmits a first reset signal to a gate of the driving transistor to reset the gate of the driving transistor, and the second reset module transmits a second reset signal to the anode of the light-emitting element to reset the anode of the light-emitting element. In the data writing phase, the data writing module and the compensation module are turned on, the data writing module transmits a data signal provided by a data signal terminal to the gate of the driving transistor, and the compensation module performs threshold compensation on the driving transistor. In the light-emitting phase, the power supply voltage writing module and the light-emitting control module are turned on, the power supply voltage writing module transmits a first voltage signal provided by a first power signal line to the driving transistor, to drive the driving transistor to form a current transmitted to the light-emitting element.

Another aspect of the present disclosure provides a display device. The display device includes a display panel. The display panel includes a pixel driving circuit, a scan line, and a light-emitting control line connected to the pixel driving circuit. The pixel driving circuit includes a driving transistor, a first reset module, and a light-emitting element. An output terminal of the first reset module is connected to a gate of the driving transistor and an output terminal of the driving transistor is electrically connected to the light-emitting element. An input terminal of the first reset module is connected to the scan line or the light-emitting control line. A scan signal provided by the scan line or a light-emitting control signal provided by the light-emitting control line is multiplexed as a first reset signal provided by the reset module to the gate of the driving transistor.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
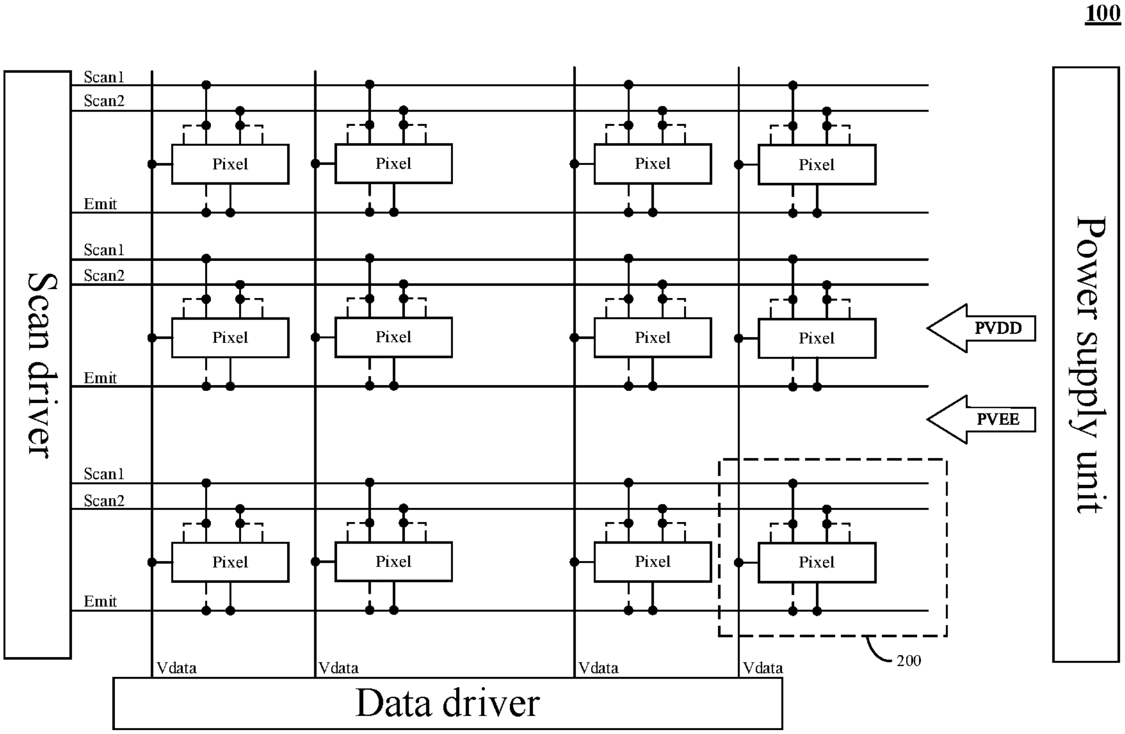
FIG. 1 illustrates a circuit structure of an exemplary display panel consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

For display panels of a same size, when one display panel has a higher resolution, the number of pixels and pixel driving circuits is higher. However, since the display area is constant, the size of the pixel driving circuits needs to be further reduced. The pixel driving circuits include many devices, and the space for wiring is further reduced. Too tight wiring may cause leakage, crosstalk and other problems.

The present disclosure provides a display panel. In one embodiment shown in FIG. 1 illustrating an exemplary display panel 000 and FIG. 2 illustrating an exemplary pixel driving circuit, the display panel 000 may at least include pixel driving circuits 200, and scan lines Scan and light-emitting control lines Emit connected to the pixel driving circuits 200.

One pixel driving circuit 200 may include a driving transistor M0, a first reset module 10, and a light-emitting element D. An output terminal of the first reset module 10 may be connected to a gate of the driving transistor M0, and an output terminal of the driving transistor M0 may be electrically connected to the light-emitting element D.

An input terminal of the first reset module 10 may be connected to one corresponding scan line Scan or one corresponding light-emitting control line Emit. A scan signal provided by the scan line Scan or a light-emitting control signal provided by the light-emitting control line Emit may be multiplexed as a first reset signal provided by the first reset module 10 to the gate of the driving transistor M0.

Figure 2:
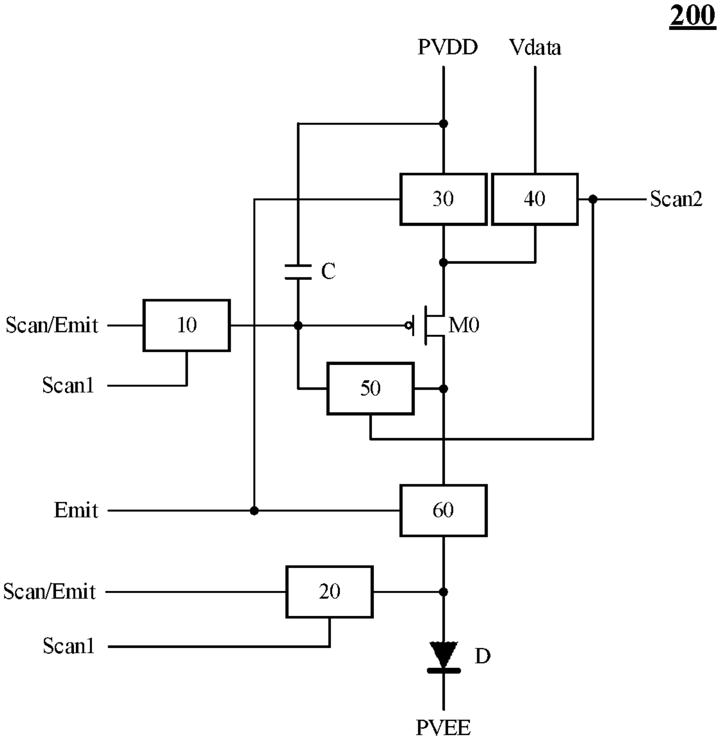
FIG. 2 illustrates an exemplary pixel driving circuit consistent with various disclosed embodiments of the present disclosure.

As shown in FIG. 1, in some embodiments, the display panel 100 may include a plurality of sub-pixels Pixel arranged in an array, and may further include a scan driver, a power supply unit, and a data driver. The scan driver may provide driving signals to the plurality of sub-pixels Pixel through a plurality of driving signal lines including the scan signal lines Scan and the light-emitting control lines Emit. The power supply unit may provide power signals to the plurality of sub-pixels Pixel through power signal lines including a first power signal line PVDD or a second power signal line PVEE. The data driver may provide data signals to the plurality of sub-pixels Pixel through data signal lines Vdata.

As shown in FIG. 2, each sub-pixel Pixel may correspond to one pixel driving circuit 200. One pixel driving circuit 200 may at least include the driving transistor M0 and the light-emitting element D. The first power signal line PVDD, the driving transistor M0, the light-emitting element D and the second power signal line PVEE may be connected in series in sequence. A voltage difference between a first power signal provided by the first power signal line PVDD and a second power signal provided by the second power signal line PVEE may drive the driving transistor M0 to generate a driving current, and the driving current may be transmitted to the light-emitting element D. The light-emitting element D may emit light under the action of the driving current.

Further, the pixel driving circuit 200 may further include the first reset module 10. The output terminal of the first reset module 10 may be connected to the gate of the driving transistor M0. The first reset signal output by the first reset module 10 may reset the gate of the driving transistor M0, and clear residual voltage on the gate of the driving transistor M0 during the last light-emitting, such that the current light-emitting is able to be carried out according to the preset voltage, improving the display accuracy.

Further, the display panel 100 may include the scan lines Scan and the light-emitting control lines Emit. In one pixel driving circuit, the input terminal of the first reset module 10 may be electrically connected to one corresponding scan line Scan or one corresponding light-emitting control line Emit, and the scan signal provided by the scan line Scan or the light-emitting control signal provided by the light-emitting control line Emit may be multiplexed as the first reset signal.

The scan signal provided by the scan line Scan or the light-emitting control signal provided by the light-emitting control line Emit may be multiplexed as the first reset signal. The first reset signal may be set according to the type of the driving transistor M0. Exemplarily, when the driving transistor M0 is a P-type transistor, the first reset signal may be a low-level signal. That is, when the first reset module 10 is turned on and the scan signal line provided by the scan line Scan or the light-emitting control signal provided by the light-emitting control line Emit is a low level signal, the gate of the driving transistor M0 may be reset. When the driving transistor M0 is an N-type transistor, the first reset signal may be a high-level signal. That is, when the first reset module 10 is turned on and the scan signal line provided by the scan line Scan or the light-emitting control signal provided by the light-emitting control line Emit is a high-level signal, the gate of the driving transistor M0 may be reset.

In the present disclosure, in the first reset signal module 10, the input terminal of may be electrically connected to the corresponding scan line Scan or the corresponding light-emitting control line Emit, and the output terminal may be electrically connected to the gate of the driving transistor M0. The scan signal provided by the scan line Scan or the light-emitting control signal provided by the light-emitting control line Emit may be multiplexed as the first reset signal, and the first reset signal may be transmitted to the gate of the driving transistor M0 through the first reset module 10 to reset the gate of the driving transistor M0. By multiplexing the scan signal or the light-emitting control signal as the first reset signal, no additional reset line may be necessary, saving wiring space. In a high-density display panel, the problems of small wiring spacing, electric leakage, and crosstalk between wirings caused by too many wirings may be avoided.

In one embodiment, as shown in FIG. 2, the pixel driving circuit 200 may further include a second reset module 20. An output terminal of the second reset module 20 may be electrically connected to the anode of the light-emitting element D.

An input terminal of the second reset module 20 may be connected to the corresponding scan line Scan or the corresponding light-emitting control line Emit. The scan signal provided by the scan line Scan, or the light-emitting control signal provided by the light-emitting control line Emit may be multiplexed as a second reset signal provided by the second reset module 20 to the anode of the light-emitting element D.

In the present embodiment, the pixel driving circuit 200 may further include the second reset module 20. The output terminal of the second reset module 20 may be electrically connected to the anode of the light-emitting element D, and the second reset signal output by the second reset module 20 may be used to reset the anode of the light-emitting element D, to clear the residual voltage on the anode of the light-emitting element D during the last light-emitting, such that the current light-emitting is able to emit light according to the preset voltage and the display accuracy is improved.

The input terminal of the second reset module 20 may be connected to the corresponding scan line Scan or the corresponding light-emitting control line Emit. The scan signal provided by the scan line Scan, or the light-emitting control signal provided by the light-emitting control line Emit may be multiplexed as the second reset signal.

In the present embodiment, the input terminal of the second reset module 20 may be connected to the corresponding scan line Scan or the corresponding light-emitting control line Emit. The output terminal of the second reset module 20 may be electrically connected to the anode of the light-emitting element D. The scan signal provided by the scan line Scan, or the light-emitting control signal provided by the light-emitting control line Emit may be multiplexed as the second reset signal, and the second reset signal may be transmitted by the second reset module 20 to the anode of the light-emitting element D, to reset the anode of the light-emitting element D. By multiplexing the scan signal or the light-emitting control signal as the second reset signal, no additional reset line may be necessary, saving wiring space. In a high-density display panel, the problems of small wiring spacing, electric leakage, and crosstalk between wirings caused by too many wirings may be avoided.

In one embodiment shown in FIG. 1, the scan lines Scan may include first scan lines Scan1 and second scan lines Scan2.

The first scan lines Scan1 may provide first scan signals, and the second scan lines Scan2 may provide second scan signals.

The scan driver of the display panel 100 may provide the scan signals to the pixel drive circuits 200 through the scan lines Scan. Specifically, the scan lines Scan may at least include the first scan lines Scan1 and the second scan lines Scan2. The first scan line Scan1 and the second scan line Scan2 respectively provide first scan signals and second scan signals.

As shown in FIG. 1, in one optional embodiment, the scan driver in the display panel 100 may provide one first scan line Scan and one second scan line Scan2 to each row of the plurality of sub-pixels Pixel. The pixel driving circuits 200 of the sub-pixels Pixel in a same row may obtain the first scan signals and the second scan signals from the first scan line Scan1 and the second scan line Scan2 of each row respectively.

In another embodiment, the second scan line Scan2 in the n-th row may be multiplexed as the first scan line Scan1 of the pixel driving circuit 200 in the (n+1)-th row, where n is an integer and n>1. In other words, the scan lines Scan may be multiplexed between adjacent rows. For example, one first scan line Scan1 and one second scan line Scan2 extending along the row direction may be disposed at one side of the pixel driving circuits 200 in the first row, such that the first scan line Scan1 and the second scan line Scan2 may respectively provide the first scan signal and the second scan signal to the pixel driving circuits 200 in the first row. One second scan line Scan2 extending along the row direction may be provided between the pixel driving circuits 200 in the first row and the pixel driving circuits 200 in the second row to provide the second scan line for the pixel driving circuits 200 in the second row. At the same time, the second scan line Scan2 on the side of the pixel driving circuits 200 in the first row may be multiplexed as the first scan line Scan1 of the pixel driving circuits 200 in the second row.

In the present disclosure, the scan lines Scan may include the first scan lines Scan1 and the second scan lines Scan2, and the first scan lines Scan1 and the second scan lines Scan2 may be disposed in two ways. When the data writing modules in the pixel driving circuits 200 of the n-th row are turned on and write data under the control of the second scan signal, the second scan signal may simultaneously control the first reset modules 10 in the pixel driving circuits 200 of the (n+1)-th row to be turned on to reset the gates of the driving transistors M0. The wirings may be reduced and the wiring spaces may be saved. The electric leakage and crosstalk between adjacent wirings may be avoided. Also, the signals may be utilized fully to reduce display response time and improve display effect.

In one embodiment shown in FIG. 2, the pixel driving circuit of the display panel 200 may further include a power supply voltage writing module 30, a data writing module 40, a compensation module 50, a light-emitting control module 60, and a capacitor C. The power supply voltage writing module 30 may be connected in series between the driving transistor M0 and the first power signal line PVDD. A control terminal of the power supply voltage writing module 30 may be connected to the light-emitting control line Emit, and an input terminal of the power supply voltage writing module 30 may be connected to the first power signal Line PVDD. An output terminal of the power supply voltage writing module 30 may be connected to the input terminal of the driving transistor M0.

The data writing module 40 may be connected in series between the driving transistor M0 and the data signal line Vdata. A control terminal of the data writing module 40 may be connected to the second scan line Scan2, an input terminal of the data writing module 40 may be connected to the data signal line Vdata, and an output terminal of the data writing module 40 may be connected to the input terminal of the driving transistor M0.

The compensation module 50 may be connected in series between the gate of the driving transistor M0 and the output terminal of the driving transistor M0. A control terminal of the compensation module 50 may be connected to the second scan line Scan2, an input terminal of the compensation module 50 may be connected to the output terminal of the driving transistor M0, and an output terminal of the compensation module 50 may be connected to the gate of the driving transistor of M0.

The light-emitting control module 60 may be connected in series between the driving transistor M0 and the light-emitting element D. A control terminal of the light-emitting control module 60 may be connected to the light-emitting control line Emit, the input terminal of the light-emitting control module 60 may be connected to the driving transistor M0, and an output terminal of the light-emitting control module 60 may be connected to the anode of the light-emitting element D.

The first terminal of the capacitor C may be connected to the first power signal line PVDD, and the second terminal of the capacitor C may be connected to the gate of the driving transistor M0.

The power supply voltage writing module 30 may be connected in series between the driving transistor M0 and the first power signal line PVDD. The control terminal of the power supply voltage writing module 30 may be connected to the light-emitting control line Emit. In the light-emitting stage, the power supply voltage writing module 30 may be turned on under the control of the light-emitting control signal provided by the light-emitting control line Emit, and transmit the first voltage signal provided by the first power signal line PVDD to the input terminal of the driving transistor M0.

The data writing module 40 may be connected in series between the driving transistor M0 and the data signal line Vdata. The control terminal of the data writing module 40 may be connected to the second scan line Scan2. In the data writing stage, the data writing module 40 may be turned on under the control of the second scan signal provided by the second scan line Scan2, and transmit the data signal provided by the data signal line Vdata to the first node N1 through the driving transistor M0.

Further, the compensation module 50 may be connected in series between the gate of the driving transistor M0 and the output terminal. The control terminal of the compensation module 50 may be connected to the second scan line Scan2. In the data writing stage, the compensation module 50 may be turned on under the control of the second scan signal provided by the second scan line Scan2, to detect and self-compensate the deviation of the threshold voltage of the driving transistor M0.

Further, the light-emitting control module 60 may be connected between the driving transistor M0 and the light-emitting element D in series. The control terminal of the light-emitting control module 60 may be connected to the light-emitting control line Emit. In the light-emitting stage, the light-emitting control module 60 may be turned on under the control of the light-emitting control signal provided by the light-emitting control line Emit, and transmit the driving current generated by the driving transistor M0 to the anode of the light-emitting element D, such that the light-emitting element D emits light.

Further, the capacitor C may be connected in series between the first power signal line PVDD and the gate of the driving transistor M0. The capacitor C may be used to maintain the potential of the gate of the driving transistor M0.

In the present disclosure, in the data writing stage, the data writing module may transmit the data signal provided by the data line Vdata to the input terminal of the driving transistor M0, and the compensation module 50 may compensate the deviation of the threshold voltage of the driving transistor M0. Then, the capacitor C may maintain the gate voltage of the driving transistor M0. In the light-emitting stage, the power supply voltage writing module 40 and the light-emitting control module 60 may be turned on, and the first voltage signal provided by the first power signal line may be transmitted to the input terminal of the driving transistor M0, such that the driving transistor M0 generates a driving current. The driving current may be transmitted to the light-emitting element D through the light-emitting control module 60 to realize the display function.

Figure 3:
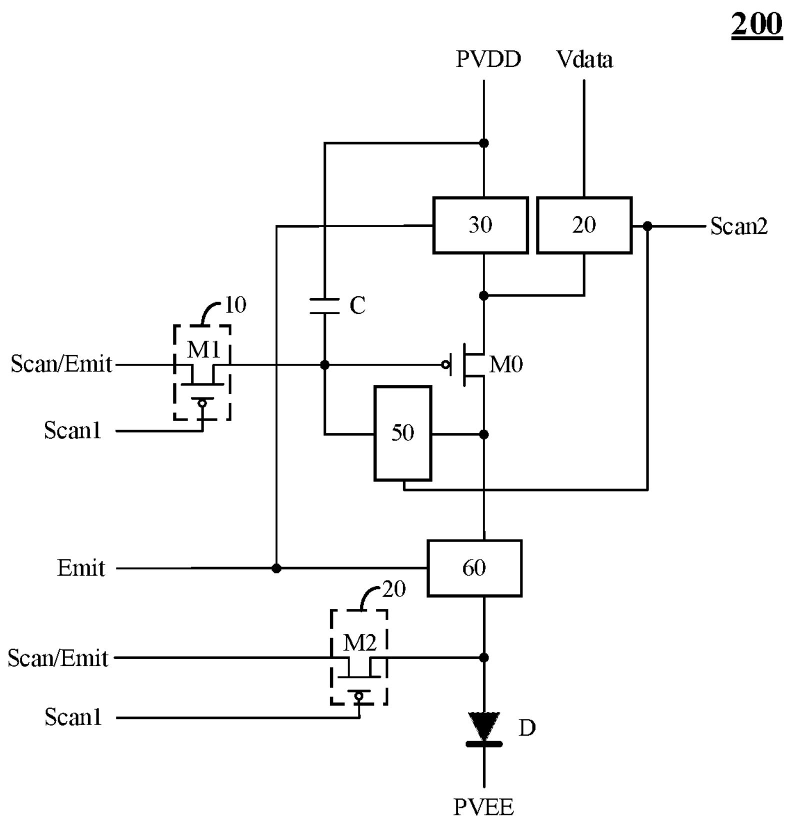
FIG. 3 illustrates another exemplary pixel driving circuit consistent with various disclosed embodiments of the present disclosure.

In another embodiment shown in FIG. 3 which illustrates another pixel driving circuit, the first reset module 10 may include a first transistor M1. A gate of the first transistor M1 may be connected to the first scan line Scan1, a first terminal of the first transistor M1 may be connected to the first scan line Scan1 or the second scan line Scan2 or the light-emitting control line Emit, and a second terminal of the first transistor M1 may be connected to the gate of the driving transistor M0.

In the present embodiment, the first reset module 10 may include the first transistor M1. The gate of the first transistor M1 may be the control terminal of the first reset module 10, the first terminal of the first transistor M1 may be the input terminal of the first reset module 10, and the second terminal of the first transistor M1 may be the output terminal of the first reset module 10. Therefore, the gate of the first transistor M1 may be electrically connected to the corresponding first scan line Scan1 of the scan lines Scan, and the first scan signal provided by the first scan line Scan1 may control the on/off of the first transistor M1.

When the first transistor M1 is turned on, the first scan line Scan1 or the second scan line Scan2 or the light-emitting control line Emit connected to the first terminal of the first transistor M1 may provide the first scan signal or the second scan signal or the light-emitting control signal respectively. The first scan signal or the second scan signal or the light-emitting control signal may be multiplexed as the first reset signal and the first reset signal may be transmitted to the gate of the driving transistor M0 through the first transistor M1, to reset the gate of the driving transistor M0 and clear the residual voltage on the gate of the driving transistor M0 during the last light-emitting. Therefore, the present light-emitting may be able to be carried out according to the preset voltage, which improves the display accuracy.

The first transistor M1 may be a P-type transistor or an N-type transistor. When the first transistor M1 is a P-type transistor, the first transistor M1 is turned on when the gate of the first transistor M1 is at a low potential. That is, when the first scan signal Scan1 provides a low level signal, the first transistor M1 may be turned on. When the first transistor M1 is an N-type transistor, the first transistor M1 is turned on when the gate of the first transistor M1 is at a high potential. That is, when the first scan signal Scan1 provides a high level signal, the first transistor M1 may be turned on. The embodiment shown in FIG. 3 where the first transistor M1 is a P-type transistor is used as an example only for illustration, but does not limit the scope of the present disclosure. In various embodiments, the first transistor M1 may be a P-type transistor or an N-type transistor.

In the present disclosure, the gate of the first transistor M1 may be connected to the first scan line Scan1, the first terminal of the first transistor M1 may be connected to the first scan line Scan1 or the second scan line Scan2 or the light-emitting control line Emit, and the second terminal of the first transistor M1 may be connected to the gate of the driving transistor M0. Therefore, the first scan signal provided by the first scan line Scan1 may control the on/off of the first transistor M1. When the first transistor M1 is turned on, the first scan line Scan1 or the second scan line Scan2 or the light-emitting control line Emit connected to the first terminal of the first transistor M1 may provide the first scan signal or the second scan signal or the light-emitting control signal respectively. The first scan signal or the second scan signal or the light-emitting control signal may be multiplexed as the first reset signal and the first reset signal may be transmitted to the gate of the driving transistor M0 through the first transistor M1, to reset the gate of the driving transistor M0. By multiplexing the first scan signal or the second scan signal or the light-emitting control signal respectively as the first reset signal, there may be no need to additionally arrange reset lines, which saves wiring space. In a high-density display panel, the problems of small wiring spacing, electric leakage and crosstalk between wirings because of too many wirings may be avoided. Further, the first reset module 10 may be formed by the first transistor M1, and the on/off state of the first transistor M1 may be controlled by using the voltage of the gate of the first transistor M1, thereby realizing the control of the first reset module 10 and simplifying up the process.

In one embodiment shown in FIG. 3, the second reset module 20 may include a second transistor M2. A gate of the second transistor M2 may be connected to the first scan line Scan1, a first terminal of the second transistor is connected to the first scan line Scan1 or the second scan line Scan2 or the light-emitting control line Emit, and a second terminal of the second transistor M2 is connected to the anode of the light-emitting element D.

In the present embodiment, the second reset module 20 may include the second transistor M2. The gate of the second transistor M2 may be the control terminal of the second reset module 20, the first terminal of the second transistor M2 may be the input terminal of the second reset module 20, and the second terminal of the second transistor M2 may be the output terminal of the second reset module 20. Therefore, the gate of the second transistor M2 may be electrically connected to the corresponding first scan line Scan1 of the scan lines Scan, and the first scan signal provided by the first scan line Scan1 may control the on/off of the second transistor M2.

When the second transistor M2 is turned on, the first scan line Scan1 or the second scan line Scan2 or the light-emitting control line Emit connected to the first terminal of the second transistor M2 may provide the first scan signal or the second scan signal or the light-emitting control signal respectively. The first scan signal or the second scan signal or the light-emitting control signal may be multiplexed as the second reset signal and the second reset signal may be transmitted to the anode of the light-emitting element D through the second transistor M2, to reset the anode of the light-emitting element D and clear the residual voltage on the anode of the light-emitting element D during the last light-emitting. Therefore, the present light-emitting may be able to be carried out according to the preset voltage, which improves the display accuracy.

The second transistor M2 may be a P-type transistor or an N-type transistor. When the second transistor M2 is a P-type transistor, the second transistor M2 is turned on when the gate of the second transistor M2 is at a low potential. That is, when the first scan signal Scan1 provides a low level signal, the second transistor M2 may be turned on. When the second transistor M2 is an N-type transistor, the second transistor M2 is turned on when the gate of the second transistor M2 is at a high potential. That is, when the first scan signal Scan1 provides a high level signal, the second transistor M2 may be turned on. The embodiment shown in FIG. 5 where the second transistor M2 is a P-type transistor is used as an example only for illustration, but does not limit the scope of the present disclosure. In various embodiments, the second transistor M2 may be a P-type transistor or an N-type transistor.

In the present disclosure, the gate of the second transistor M2 may be connected to the first scan line Scan1, the first terminal of the second transistor M2 may be connected to the first scan line Scan1 or the second scan line Scan2 or the light-emitting control line Emit, and the second terminal of the second transistor M2 may be connected the anode of the light-emitting element D. Therefore, the first scan signal provided by the first scan line Scan1 may control the on/off of the second transistor M2. When the second transistor M2 is turned on, the first scan line Scan1 or the second scan line Scan2, or the light-emitting control line Emit connected to the first terminal of the second transistor M2 may provide the first scan signal or the second scan signal or the light-emitting control signal respectively. The first scan signal or the second scan signal or the light-emitting control signal may be multiplexed as the second reset signal and the second reset signal may be transmitted to the anode of the light-emitting element D through the second transistor M2, to reset the anode of the light-emitting element D. By multiplexing the first scan signal or the second scan signal or the light-emitting control signal respectively as the second reset signal, there may be no need to additionally arrange reset lines, which saves wiring space. In a high-density display panel, the problems of small wiring spacing, electric leakage, and crosstalk between wirings because of too many wirings may be avoided. Further, the second reset module 20 may be formed by the second transistor M2, and the on/off state of the second transistor M2 may be controlled by using the voltage of the gate of the second transistor M2, thereby realizing the control of the second reset module 20 and simplifying up the process.

Figure 4:
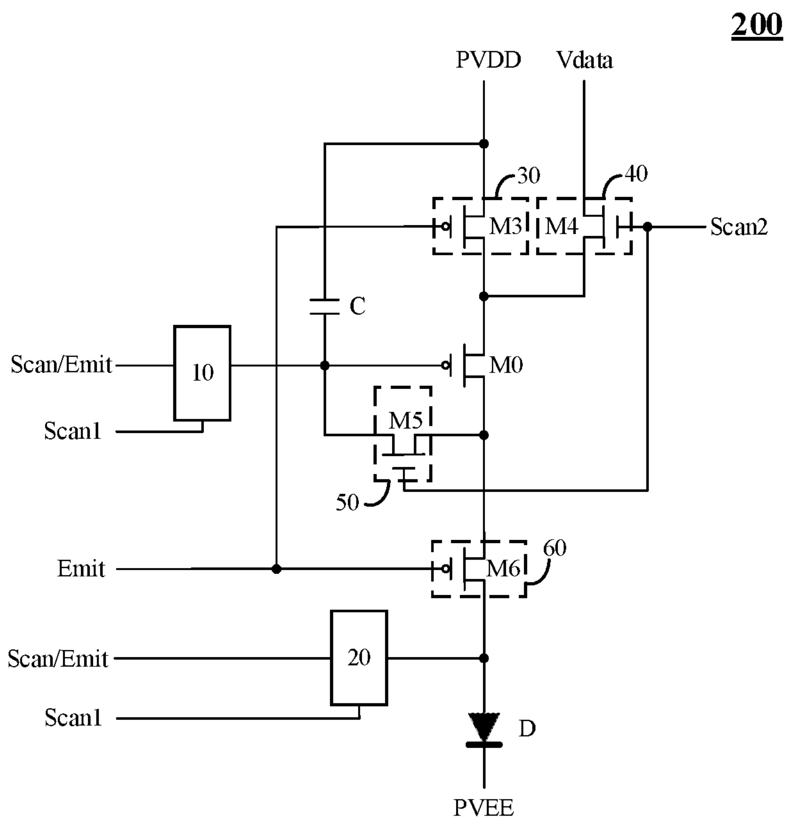
FIG. 4 illustrates another exemplary pixel driving circuit consistent with various disclosed embodiments of the present disclosure.

In another embodiment shown in FIG. 4 illustrating another pixel driving circuit, the power supply voltage writing module 30 may include a third transistor M3. A gate of the third transistor M3 may be connected to the light-emitting control line Emit, a first terminal of the third transistor M3 may be connected to the first power signal line PVDD, and a second terminal of the third transistor M3 may be connected to the input terminal of the driving transistor M0.

The data writing module 40 may include a fourth transistor M4. A gate of the fourth transistor M4 may be connected to the second scan line Scan2, a first terminal of the fourth transistor M4 may be connected to the data signal line Vdata, and a second terminal of the fourth transistor M4 may be connected to the input terminal of the driving transistor M0.

The compensation module 50 may include a fifth transistor M5. A gate of the fifth transistor M5 may be connected to the second scan line Scan2, a first terminal of the fifth transistor M5 may be connected to the output terminal of the driving transistor M0, and a second terminal of the fifth transistor M5 may be connected to the gate of the driving transistor M0.

The light-emitting control module 60 may include a sixth transistor M6. A gate of the sixth transistor M6 may be connected to the light-emitting control line Emit, a first terminal of the sixth transistor M6 may be connected to the output terminal of the driving transistor M0, and a second terminal of the sixth transistor M0 may be connected to the anode of the light-emitting element D.

The power supply voltage writing module 30 may include the third transistor M3. The gate of the three transistors M3 may be the control terminal of the power supply voltage writing module 30, the first terminal may be the input terminal of the power supply voltage writing module 30, and the second terminal may be the output terminal of the power supply voltage writing module 30. The gate of the third transistor M3 may be connected to the light-emitting control signal line Emit, and the light-emitting control signal provided by the light-emitting control signal line Emit may control the on/off states of the third transistor M3.

Further, the data writing module 40 may include the fourth transistor M4. The gate of the fourth transistor M4 may be the control terminal of the data writing module 40; the first terminal of the fourth transistor M4 may be the input terminal of the data writing module 40, and the second terminal of the fourth transistor M4 may be the output terminal of the data writing module 40. The gate of the fourth transistor M4 may be electrically connected to the second scan line Scan2, and the second scan signal provided by the second scan line Scan2 may control the on/off states of the fourth transistor M4.

Further, the compensation module 50 may include the fifth transistor M5. The gate of the fifth transistor M5 may be the control terminal of the compensation module 50, the first terminal may be the input terminal of the compensation module 50, and the second terminal may be the output terminal of the compensation module 50. The gate of the fifth transistor M5 may be connected to the second scan line Scan2, and the second scan signal provided by the second scan line Scan2 may control the on/off states of the fifth transistor M5.

Further, the light-emitting control module 60 may include the sixth transistor M6. The gate of the sixth transistor M6 may be the control terminal of the light-emitting control module 60, the first terminal may be the input terminal of the light-emitting control module 60, and the second terminal may be the output terminal of the light-emitting control module 60. The gate of the sixth transistor M6 may be connected to the light-emitting control signal line Emit, and the light-emitting control signal provided by the light-emitting control signal line Emit may control the on/off of the sixth transistor M6.

In the present embodiment, the power supply voltage writing module 30 may include the third transistor M3, the data writing module 40 may include the fourth transistor M4, the compensation module 50 may include the fifth transistor M5, and the light-emitting control module 60 may include the sixth transistor M6. The display panel 100 may turn on or off the functional modules by turning on and off the corresponding transistors. The gates of the third transistor M3, the fourth transistor M4, the fifth transistor M5 and the sixth transistor M6 may be electrically connected to the light-emitting control line Emit or the second scan line Scan2 respectively. The high-level signal/low-level signal of different periods in the light-emitting control signal provided by the light-emitting control line Emit or the second scan signal timing provided by the second scan line Scan2 may be used to control the on/off of the power supply voltage writing module 30, the data writing module 40, the compensation module 50, or the light-emitting control module 60.

Figure 5:
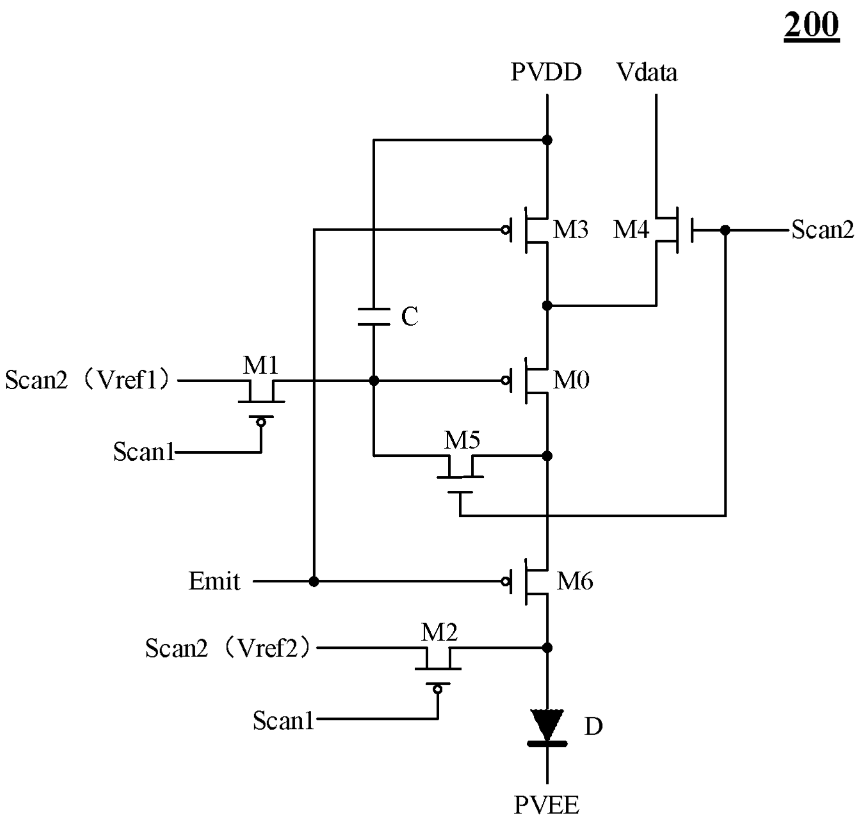
FIG. 5 illustrates another exemplary pixel driving circuit consistent with various disclosed embodiments of the present disclosure.
Figure 6:
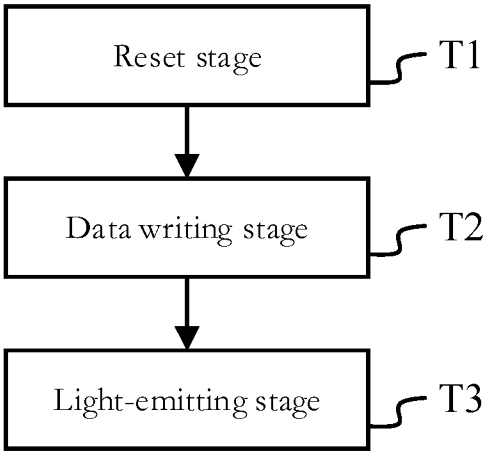
FIG. 6 illustrates a flowchart of an exemplary driving method consistent with various disclosed embodiments of the present disclosure.
Figure 7:
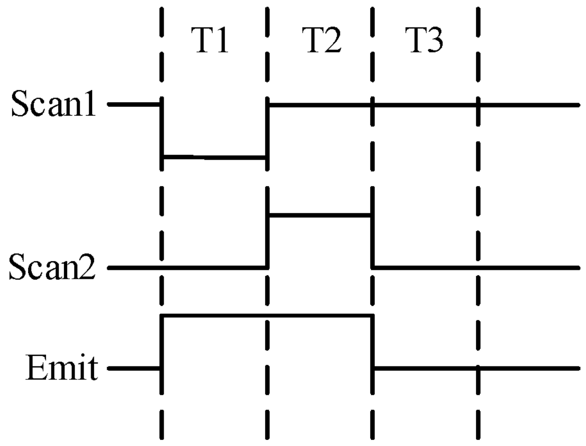
FIG. 7 illustrates a timing diagram of the pixel driving circuit in FIG. 5, consistent with various disclosed embodiments of the present disclosure.

In one embodiment shown in FIG. 5 illustrating another pixel driving circuit, FIG. 6 illustrating a flow chart of a driving method, and FIG. 7 illustrating a timing diagram of the pixel driving circuit in FIG. 5, the driving transistor M0, the first transistor M1, the second transistor M2, the third transistor M3, and the sixth transistor M6 may be P-type transistors. The fourth transistor M4 and the fifth transistor M5 may be N-type transistors.

The first terminal of the first transistor M1 may be connected to the second scan line Scan2. The second scan signal provided by the second scan line Scan2 may be multiplexed as the first reset signal Vref1 provided by the first transistor M1 to the gate of the driving transistor M0.

The first terminal of the second transistor M2 may be connected to the second scan line Scan2. The second scan signal provided by the second scan line Scan2 may be multiplexed as the second reset signal Vref2 provided by the second transistor M2 to the anode of the light-emitting element D.

The P-type transistor is turned on when the gate is a low level signal, and is turned off when the gate is a high level signal. The N-type transistors are turned on when the gate is high and turned off when the gate is low. Therefore, in the present embodiment, timing design may be performed on the pixel driving circuit 200 by combining the types of each transistor in the pixel driving circuit 200. Specifically, the pixel driving circuit 200 may at least include three stages including a reset stage T1, a data writing stage T2 and a light-emitting stage T3. In the reset stage T1, the pixel driving circuit 200 may reset the gate of the driving transistor M0 and the anode of the light-emitting element D. In the data writing stage T2, the pixel driving circuit 200 may write the data signal to the gate of the driving transistor M0. In the light-emitting stage, the light-emitting element D in the pixel driving circuit 200 may be turned on and emit light.

As shown in FIG. 7, in the reset stage T1, the first scan signal provided by the first scan line Scan1 may be a low-level signal, and the second scan signal provided by the second scan line Scan2 may be a low-level signal. Since the first transistor M1 and the second transistor M2 are P-type transistors, in the reset stage T1, the first transistor M1 and the second transistor M2 may be turned on, and transmit the low-level signal provided by the second scan line Scan2 to the gate of the driving transistor M0 and the anode of the light-emitting element D. Since the driving transistor M0 is a P-type transistor, the gate of the driving transistor M0 may be reset when its voltage is low, and the anode of the light-emitting element D may be reset when its voltage is low.

In the data writing stage T2, the second scan signal provided by the second scan line Scan2 may be a high level signal. Since the fourth transistor M4 and the fifth transistor M5 are N-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Emit may be a low level signal. Since the third transistor M3 and the sixth transistor M6 are P-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, and the first terminal of the first transistor M1 and the first terminal of the second transistor M2 may be both connected to the second scan line Scan2. In the reset stage T1, the first transistor M1 and the second transistor M2 may be turned on under the action of the low-level signal provided by the first scan line Scan1 connected to the gates, and respectively transmit the low-level signal provided by the second scan line Scan2 to the gate of the driving transistor M0 and the anode of the light-emitting element D, to perform reset. By multiplexing the second scan signal provided by the second scan line Scan2 as the first reset signal and the second reset signal in the reset stage T1, there may be no need to set the reset signal line separately, saving the wiring space of the display panel 100. The spacing between wirings may be increased to avoid crosstalk between adjacent wirings.

Figure 8:
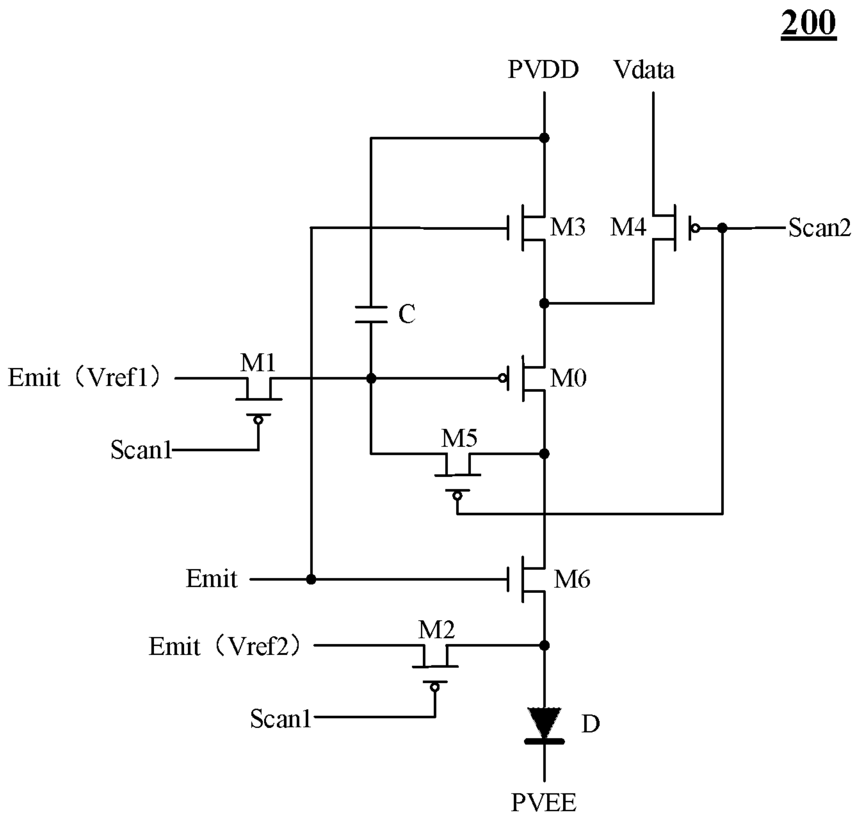
FIG. 8 illustrates another exemplary pixel driving circuit consistent with various disclosed embodiments of the present disclosure.
Figure 9:
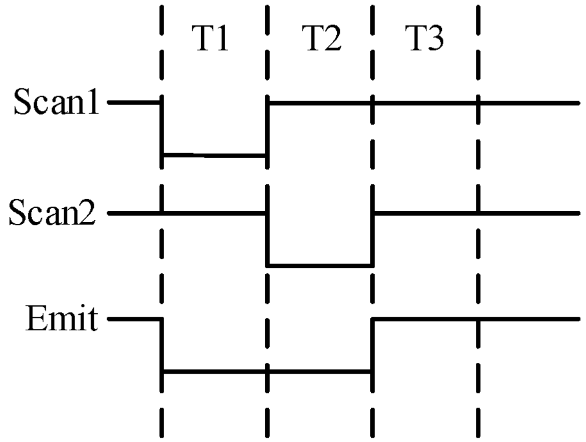
FIG. 9 illustrates a timing diagram of the pixel driving circuit in FIG. 8, consistent with various disclosed embodiments of the present disclosure.

In one embodiment shown in FIG. 6, FIG. 8 illustrating another pixel driving circuit, and FIG. 9 illustrating a timing diagram of the pixel driving circuit in FIG. 8, the driving transistor M0, the first transistor M1, the second transistor M2, the fourth transistor M4, and the fifth transistor M5 may be P-type transistors. The third transistor M3 and the sixth transistor M6 may be N-type transistors.

The first terminal of the first transistor M1 may be connected to the light-emitting control signal line Emit. The light-emitting control signal provided by the light-emitting control signal line Emit may be multiplexed as the first reset signal Vref1 provided by the first transistor M1 to the gate of the driving transistor M0.

The first terminal of the second transistor M2 may be connected to the light-emitting control signal line Emit. The light-emitting control signal provided by the light-emitting control signal line Emit may be multiplexed as the second reset signal Vref2 provided by the second transistor M2 to the anode of the light-emitting element D.

In the reset stage T1, the first scan signal provided by the first scan line Scan1 may be a low-level signal, and the light-emitting control signal provided by the light-emitting control signal line Emit may be a low-level signal. Since the first transistor M1 and the second transistor M2 are P-type transistors, in the reset stage T1, the first transistor M1 and the second transistor M2 may be turned on, and transmit the low-level signal provided by the light-emitting control signal line Emit to the gate of the driving transistor M0 and the anode of the light-emitting element D. Since the driving transistor M0 is a P-type transistor, the gate of the driving transistor M0 may be reset when its voltage is low, and the anode of the light-emitting element D may be reset when its voltage is low.

In the data writing stage T2, the second scan signal provided by the second scan line Scan2 may be a low level signal. Since the fourth transistor M4 and the fifth transistor M5 are P-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Emit may be a high level signal. Since the third transistor M3 and the sixth transistor M6 are N-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, and the first terminal of the first transistor M1 and the first terminal of the second transistor M2 may be both connected to the light-emitting control signal line Emit. In the reset stage T1, the first transistor M1 and the second transistor M2 may be turned on under the action of the low-level signal provided by the first scan line Scan1 connected to the gates, and respectively transmit the low-level signal provided by the light-emitting control signal line Emit to the gate of the driving transistor M0 and the anode of the light-emitting element D, to perform reset. By multiplexing the light-emitting control signal provided by the light-emitting control signal line Emit as the first reset signal and the second reset signal in the reset stage T1, there may be no need to set the reset signal line separately, saving the wiring space of the display panel 100. The spacing between wirings may be increased to avoid crosstalk between adjacent wirings.

Figure 10:
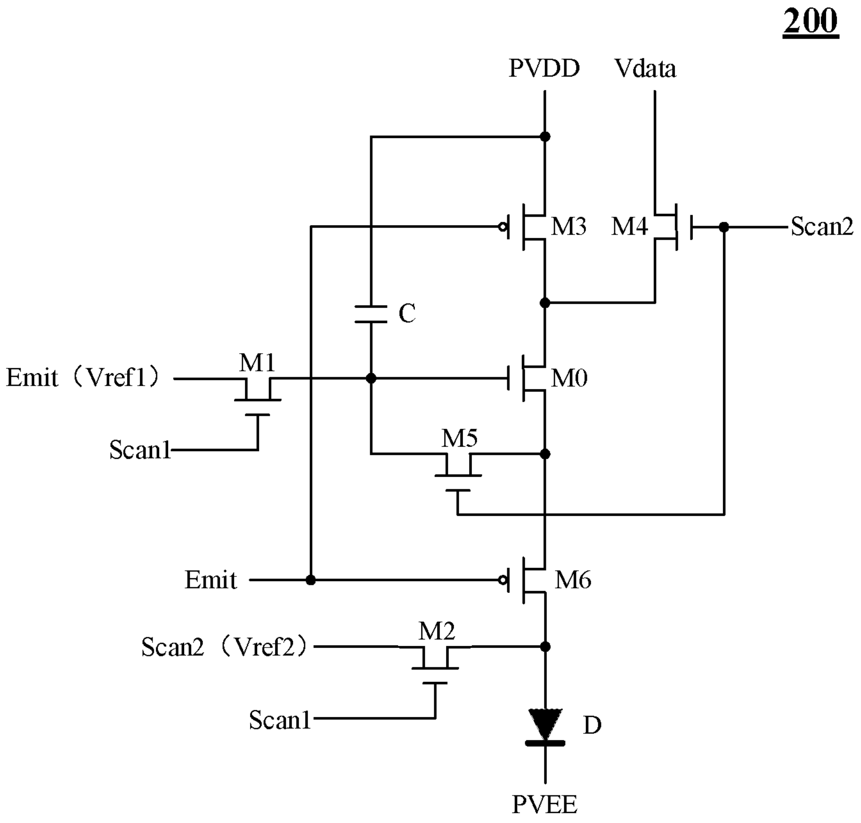
FIG. 10 illustrates another exemplary pixel driving circuit consistent with various disclosed embodiments of the present disclosure.
Figure 11:
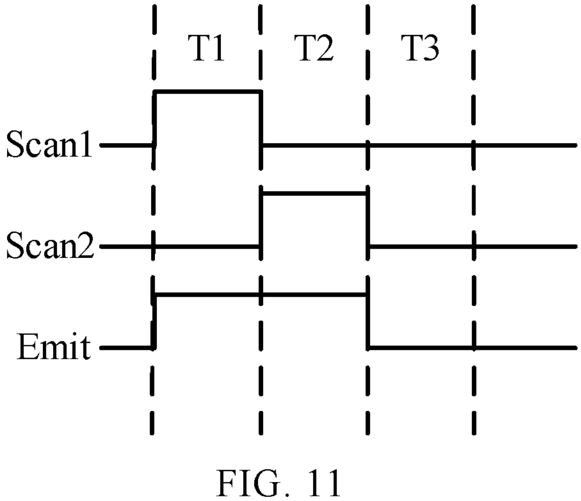
FIG. 11 illustrates a timing diagram of the pixel driving circuit in FIG. 10, consistent with various disclosed embodiments of the present disclosure.

In one embodiment shown in FIG. 6, FIG. 10 illustrating another pixel driving circuit, and FIG. 11 illustrating a timing diagram of the pixel driving circuit in FIG. 10, the driving transistor M0, the first transistor M1, the second transistor M2, the fourth transistor M4, and the fifth transistor M5 may be N-type transistors. The third transistor M3 and the sixth transistor M6 may be P-type transistors.

The first terminal of the first transistor M1 may be connected to the light-emitting control signal line Emit. The light-emitting control signal provided by the light-emitting control signal line Emit may be multiplexed as the first reset signal Vref1 provided by the first transistor M1 to the gate of the driving transistor M0.

The first terminal of the second transistor M2 may be connected to the second scan line Scan2. The second scan signal provided by the second scan line Scan2 may be multiplexed as the second reset signal Vref2 provided by the second transistor M2 to the anode of the light-emitting element D.

In the reset stage T1, the first scan signal provided by the first scan line Scan1 may be a high-level signal, the second scan signal provided by the second scan line Scan2 may be a low-level signal, and the light-emitting control signal provided by the light-emitting control signal line Emit may be a high level signal. Since the first transistor M1 and the second transistor M2 are N-type transistors, in the reset stage T1, the first transistor M1 and the second transistor M2 may be turned on. The first transistor M1 may transmit the high-level signal provided by the light-emitting control signal line Emit to the gate of the driving transistor M0 and the second transistor M2 may transmit the low level signal provided by the second scan line Scan2 to the anode of the light-emitting element D. Since the driving transistor M0 is an N-type transistor, the gate of the driving transistor M0 may be reset when its voltage is high, and the anode of the light-emitting element D may be reset when its voltage is low.

In the data writing stage T2, the second scan signal provided by the second scan line Scan2 may be a high level signal. Since the fourth transistor M4 and the fifth transistor M5 are N-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Emit may be a low level signal. Since the third transistor M3 and the sixth transistor M6 are P-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, and the first terminal of the first transistor M1 may be connected to the light-emitting control signal line Emit and the first terminal of the second transistor M2 may be connected to the second scan line Scan2. In the reset stage T1, the first transistor M1 and the second transistor M2 may be turned on under the action of the high-level signal provided by the first scan line Scan1 connected to the gates, and respectively transmit the high-level signal provided by the light-emitting control signal line Emit and the low level signal provided by the second scan line Scan2 to the gate of the driving transistor M0 and the anode of the light-emitting element D respectively, to perform reset. By multiplexing the light-emitting control signal provided by the light-emitting control signal line Emit as the first reset signal and the second scan signal provided by the second scan line Scan2 as the second reset signal in the reset stage T1, there may be no need to set the reset signal line separately, saving the wiring space of the display panel 100. The spacing between wirings may be increased to avoid crosstalk between adjacent wirings.

Figure 12:
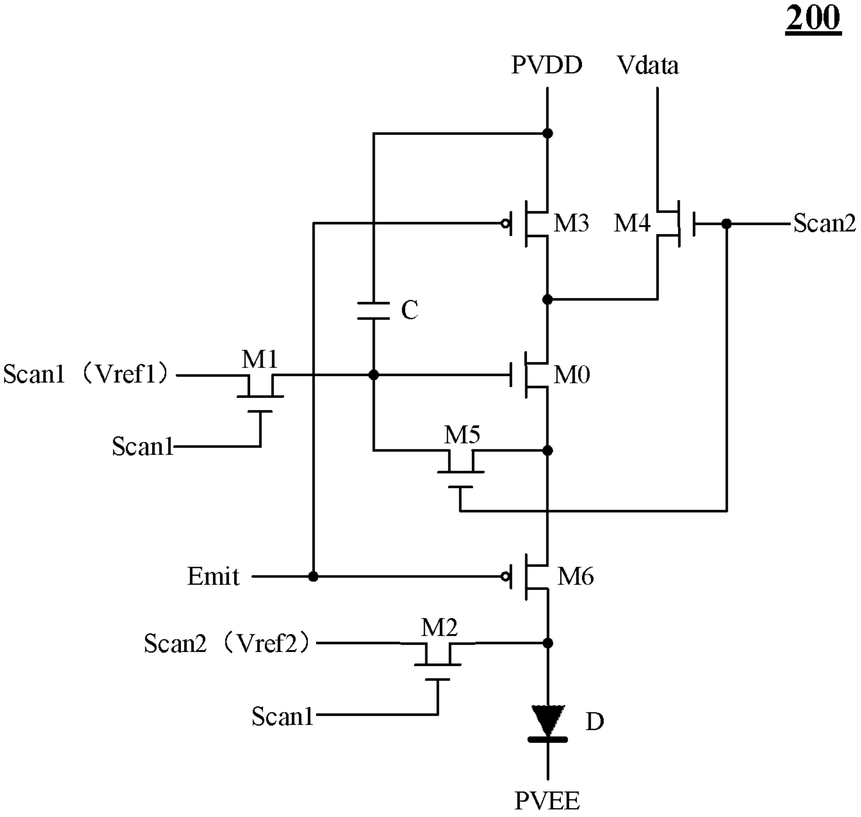
FIG. 12 illustrates another exemplary pixel driving circuit consistent with various disclosed embodiments of the present disclosure.

In one embodiment shown in FIG. 6, FIG. 11, and FIG. 12 illustrating another pixel driving circuit, the driving transistor M0, the first transistor M1, the second transistor M2, the fourth transistor M4, and the fifth transistor M5 may be N-type transistors. The third transistor M3 and the sixth transistor M6 may be P-type transistors.

The first terminal of the first transistor M1 may be connect to the first scan line Scan1. The first scan signal provided by the first scan signal line Scan1 may be multiplexed as the first reset signal Vref1 provided by the first transistor M1 to the gate of the driving transistor M0.

The first terminal of the second transistor M2 may be connected to the second scan line Scan2. The second scan signal provided by the second scan line Scan2 may be multiplexed as the second reset signal Vref2 provided by the second transistor M2 to the anode of the light-emitting element D.

In the reset stage T1, the first scan signal provided by the first scan line Scan1 may be a high-level signal, the second scan signal provided by the second scan line Scan2 may be a low-level signal, and the light-emitting control signal provided by the light-emitting control signal line Emit may be a high level signal. Since the first transistor M1 and the second transistor M2 are N-type transistors, in the reset stage T1, the first transistor M1 and the second transistor M2 may be turned on. The first transistor M1 may transmit the high-level signal provided by the light-emitting control line Emit to the gate of the driving transistor M0 and the second transistor M2 may transmit the low level signal provided by the second scan line Scan2 to the anode of the light-emitting element D. Since the driving transistor M0 is an N-type transistor, the gate of the driving transistor M0 may be reset when its voltage is high, and the anode of the light-emitting element D may be reset when its voltage is low.

In the data writing stage T2, the second scan signal provided by the second scan line Scan2 may be a high level signal. Since the fourth transistor M4 and the fifth transistor M5 are N-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Scan1 may be a low level signal. Since the third transistor M3 and the sixth transistor M6 are P-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, and the first terminal of the first transistor M1 may be connected to the first scan signal line Scan1 and the first terminal of the second transistor M2 may be connected to the second scan line Scan2. In the reset stage T1, the first transistor M1 and the second transistor M2 may be turned on under the action of the high-level signal provided by the first scan line Scan1 connected to the gates, and respectively transmit the high-level signal provided by the light-emitting control line Emit and the low level signal provided by the second scan line Scan2 to the gate of the driving transistor M0 and the anode of the light-emitting element D respectively, to perform reset. By multiplexing the first scan signal provided by the first scan signal line Scan1 as the first reset signal and the second scan signal provided by the second scan line Scan2 as the second reset signal in the reset stage T1, there may be no need to set the reset signal line separately, saving the wiring space of the display panel 100. The spacing between wirings may be increased to avoid crosstalk between adjacent wirings.

Figure 13:
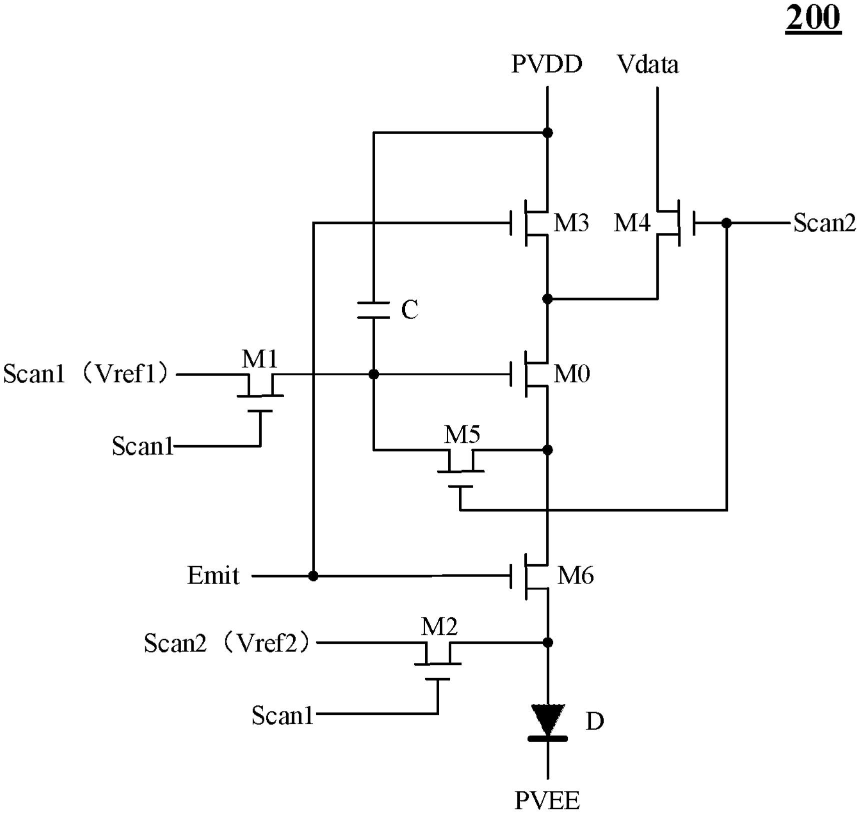
FIG. 13 illustrates another exemplary pixel driving circuit consistent with various disclosed embodiments of the present disclosure.
Figure 14:
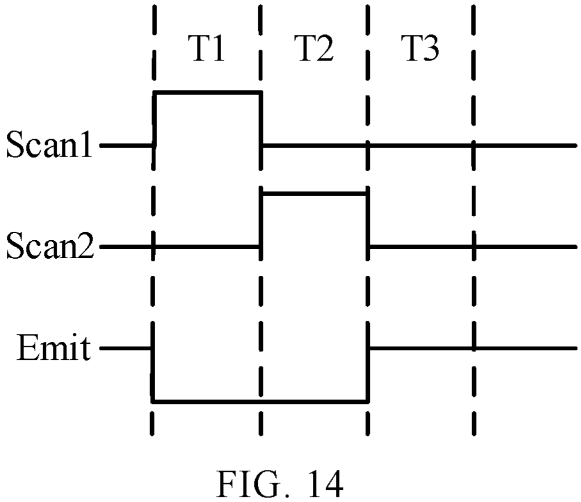
FIG. 14 illustrates a timing diagram of the pixel driving circuit in FIG. 13, consistent with various disclosed embodiments of the present disclosure.

In one embodiment shown in FIG. 6, FIG. 13 illustrating another pixel driving circuit, and FIG. 14 illustrating a timing diagram of the pixel driving circuit in FIG. 13, the driving transistor M0, the first transistor M1, the second transistor M2, the third transistor M3, the fourth transistor M4, the fifth transistor M5, and the sixth transistor M6 may be N-type transistors.

The first terminal of the first transistor M1 may be connected to the first scan line Scan1. The first scan signal provided by the first scan signal line Scan1 may be multiplexed as the first reset signal Vref1 provided by the first transistor M1 to the gate of the driving transistor M0.

The first terminal of the second transistor M2 may be connected to the second scan line Scan2. The second scan signal provided by the second scan line Scan2 may be multiplexed as the second reset signal Vref2 provided by the second transistor M2 to the anode of the light-emitting element D.

In the reset stage T1, the first scan signal provided by the first scan line Scan1 may be a high-level signal, and the second scan signal provided by the second scan line Scan2 may be a low-level signal. Since the first transistor M1 and the second transistor M2 are N-type transistors, in the reset stage T1, the first transistor M1 and the second transistor M2 may be turned on. The first transistor M1 may transmit the high-level signal provided by the first scan line Scan1 to the gate of the driving transistor M0 and the second transistor M2 may transmit the low level signal provided by the second scan line Scan2 to the anode of the light-emitting element D. Since the driving transistor M0 is an N-type transistor, the gate of the driving transistor M0 may be reset when its voltage is high, and the anode of the light-emitting element D may be reset when its voltage is low.

In the data writing stage T2, the second scan signal provided by the second scan line Scan2 may be a high level signal. Since the fourth transistor M4 and the fifth transistor M5 are N-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Scan1 may be a high level signal. Since the third transistor M3 and the sixth transistor M6 are N-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, the first terminal of the first transistor M1 may be connected to the first scan signal line Scan1, and the first terminal of the second transistor M2 may be connected to the second scan line Scan2. In the reset stage T1, the first transistor M1 and the second transistor M2 may be turned on under the action of the high-level signal provided by the first scan line Scan1 connected to the gates, and respectively transmit the high-level signal provided by the light-emitting control line Emit and the low level signal provided by the second scan line Scan2 to the gate of the driving transistor M0 and the anode of the light-emitting element D respectively, to perform reset. By multiplexing the first scan signal provided by the first scan signal line Scan1 as the first reset signal and the second scan signal provided by the second scan line Scan2 as the second reset signal in the reset stage T1, there may be no need to set the reset signal line separately, saving the wiring space of the display panel 100. The spacing between wirings may be increased to avoid crosstalk between adjacent wirings.

Figure 15:
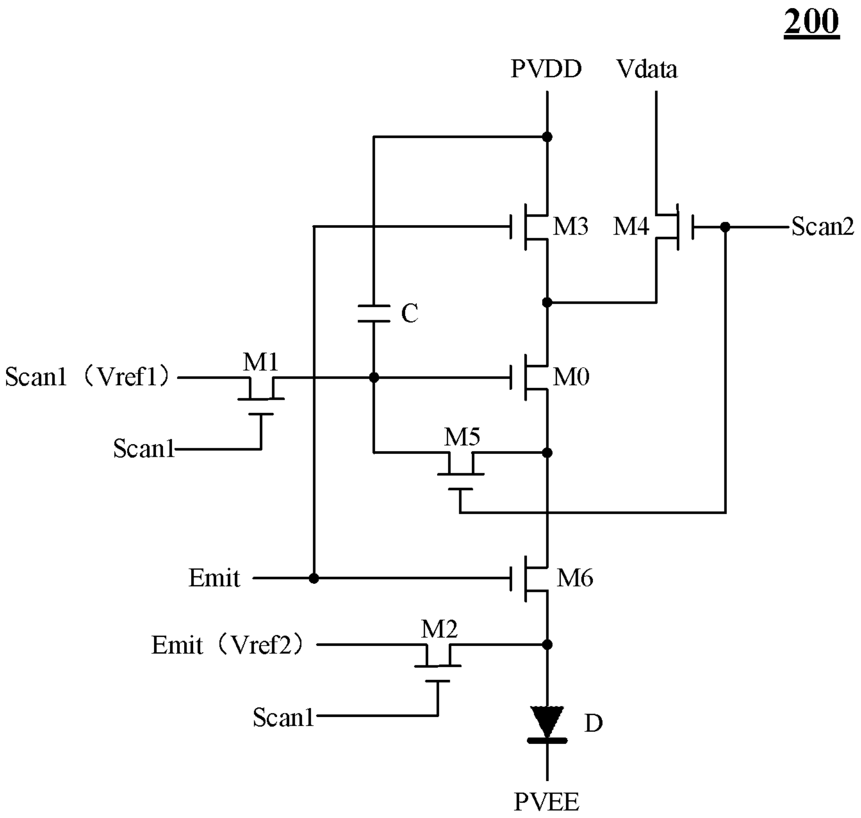
FIG. 15 illustrates another exemplary pixel driving circuit consistent with various disclosed embodiments of the present disclosure.

In one embodiment shown in FIG. 6, FIG. 14, and FIG. 15 illustrating another pixel driving circuit, the driving transistor M0, the first transistor M1, the second transistor M2, the third transistor M3, the fourth transistor M4, the fifth transistor M5, and the sixth transistor M6 may be N-type transistors.

The first terminal of the first transistor M1 may be connected to the first scan line Scan1. The first scan signal provided by the first scan signal line Scan1 may be multiplexed as the first reset signal Vref1 provided by the first transistor M1 to the gate of the driving transistor M0.

The first terminal of the second transistor M2 may be connected to the light-emitting control signal line Emit. The light-emitting control signal provided by the light-emitting control signal line Emit may be multiplexed as the second reset signal Vref2 provided by the second transistor M2 to the anode of the light-emitting element D.

In the reset stage T1, the first scan signal provided by the first scan line Scan1 may be a high-level signal, and the light-emitting control signal provided by the light-emitting control signal line Emit may be a low-level signal. Since the first transistor M1 and the second transistor M2 are N-type transistors, in the reset stage T1, the first transistor M1 and the second transistor M2 may be turned on. The first transistor M1 may transmit the high-level signal provided by the first scan line Scan1 to the gate of the driving transistor M0 and the second transistor M2 may transmit the low level signal provided the light-emitting control signal line Emit to the anode of the light-emitting element D. Since the driving transistor M0 is an N-type transistor, the gate of the driving transistor M0 may be reset when its voltage is high, and the anode of the light-emitting element D may be reset when its voltage is low.

In the data writing stage T2, the second scan signal provided by the second scan line Scan2 may be a high level signal. Since the fourth transistor M4 and the fifth transistor M5 are N-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Scan1 may be a high level signal. Since the third transistor M3 and the sixth transistor M6 are N-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, the first terminal of the first transistor M1 may be connected to the first scan signal line Scan1, and the first terminal of the second transistor M2 may be connected to the light-emitting control signal line Emit. In the reset stage T1, the first transistor M1 and the second transistor M2 may be turned on under the action of the high-level signal provided by the first scan line Scan1 connected to the gates, and respectively transmit the high-level signal provided by the first scan line Scan1 and the low level signal provided by the light-emitting control signal line Emit to the gate of the driving transistor M0 and the anode of the light-emitting element D respectively, to perform reset. By multiplexing the first scan signal provided by the first scan signal line Scan1 as the first reset signal and the light-emitting control signal provided by the light-emitting control signal line Emit as the second reset signal in the reset stage T1, there may be no need to set the reset signal line separately, saving the wiring space of the display panel 100. The spacing between wirings may be increased to avoid crosstalk between adjacent wirings.

Figure 16:
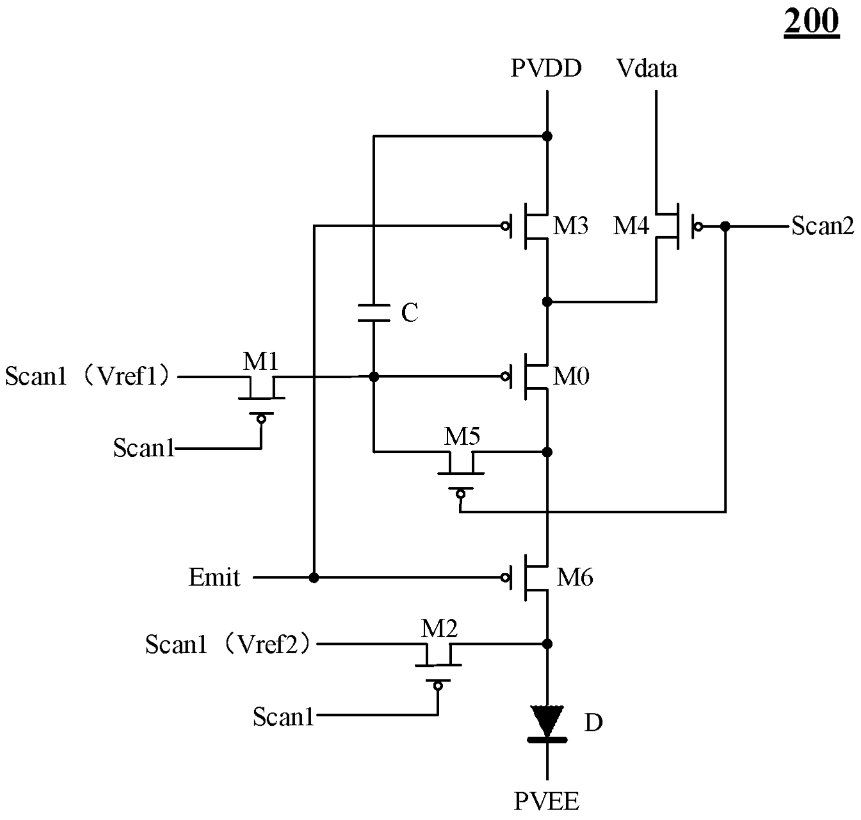
FIG. 16 illustrates another exemplary pixel driving circuit consistent with various disclosed embodiments of the present disclosure.
Figure 17:
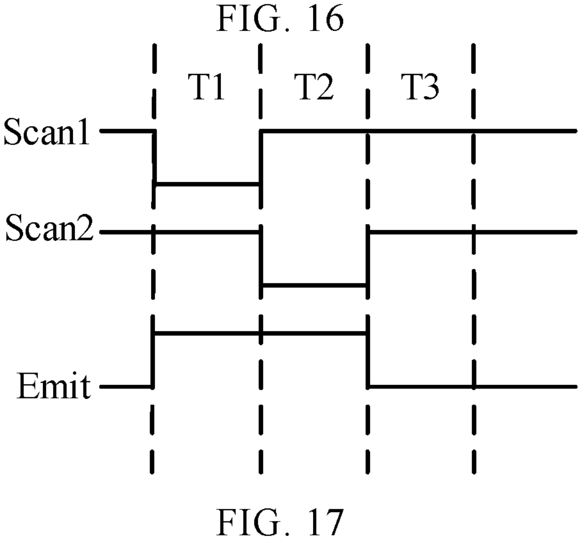
FIG. 17 illustrates a timing diagram of the pixel driving circuit in FIG. 16, consistent with various disclosed embodiments of the present disclosure.

In one embodiment shown in FIG. 6, FIG. 16 illustrating another pixel driving circuit, and FIG. 17 illustrating a timing diagram of the pixel driving circuit in FIG. 16, the driving transistor M0, the first transistor M1, the second transistor M2, the third transistor M3, the fourth transistor M4, the fifth transistor M5, and the sixth transistor M6 may be P-type transistors.

The first terminal of the first transistor M1 may be connected to the first scan line Scan1. The first scan signal provided by the first scan signal line Scan1 may be multiplexed as the first reset signal Vref1 provided by the first transistor M1 to the gate of the driving transistor M0.

The first terminal of the second transistor M2 may be connected to the first scan line Scan1. The first scan signal provided by the first scan line Scan1 may be multiplexed as the second reset signal Vref2 provided by the second transistor M2 to the anode of the light-emitting element D.

In the reset stage T1, the first scan signal provided by the first scan line Scan1 may be a low-level signal. Since the first transistor M1 and the second transistor M2 are N-type transistors, in the reset stage T1, the first transistor M1 and the second transistor M2 may be turned on. The first transistor M1 and the second transistor M2 may transmit the low-level signal provided by the first scan line Scan1 to the gate of the driving transistor M0 and the anode of the light-emitting element D. Since the driving transistor M0 is a P-type transistor, the gate of the driving transistor M0 may be reset when its voltage is low, and the anode of the light-emitting element D may be reset when its voltage is low.

In the data writing stage T2, the second scan signal provided by the second scan line Scan2 may be a low level signal. Since the fourth transistor M4 and the fifth transistor M5 are P-type transistors, in the data writing stage T2, the fourth transistor M4 and the fifth transistor M5 may be turned on, and the data signal at the data signal terminal Vdata may be transmitted to the gate of the driving transistor M0 through the fourth transistor M4, and the fifth transistor M5 may perform detection and threshold compensation on the driving transistor M0.

In the light-emitting stage T3, the light-emitting control signal provided by the light-emitting control line Scan1 may be a low level signal. Since the third transistor M3 and the sixth transistor M6 are P-type transistors, the third transistor M3 and the sixth transistor M6 may be turned on in the light-emitting stage T3. The third transistor M3 may transmit the first voltage signal of the first power signal line PVDD to the input terminal of the driving transistor M0, such that the driving transistor M0 generates a driving current. The sixth transistor M6 may transmit the driving current to the light-emitting element D, such that the light-emitting element D emits light.

In the present disclosure, both the gate of the first transistor M1 and the gate of the second transistor M2 may be connected to the first scan line Scan1, the first terminal of the first transistor M1 and the first terminal of the second transistor may be connected to the first scan signal line Scan1. In the reset stage T1, the first transistor M1 and the second transistor M2 may be turned on under the action of the low-level signal provided by the first scan line Scan1 connected to the gates, and respectively transmit the low-level signal provided by the first scan line Scan1 to the gate of the driving transistor M0 and the anode of the light-emitting element D respectively, to perform reset. By multiplexing the first scan signal provided by the first scan signal line Scan1 as the first reset signal and the second reset signal in the reset stage T1, there may be no need to set the reset signal line separately, saving the wiring space of the display panel 100. The spacing between wirings may be increased to avoid crosstalk between adjacent wirings.

Figure 18:
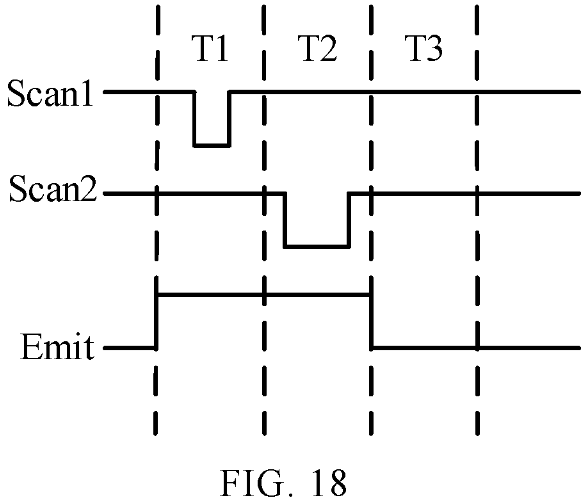
FIG. 18 illustrates another exemplary timing diagram of a pixel driving circuit consistent with various disclosed embodiments of the present disclosure.

In another embodiment, as shown in FIG. 18 illustrating a timing diagram of the pixel driving circuit, a pulse width of a scan signal multiplexed as a reset signal in the reset stage T1 (FIG. 18 uses the pixel driving circuit in FIG. 16 as an example where the first scan signal provided by the first scan line Scan1 in the reset stage T1 is multiplexed as the first reset signal and the second reset signal), may be set to be narrow, such that the voltage of the reset signal in the reset stage T1 is lower than the absolute value of the high/low level of the scan signal or the light-emitting control signal. Narrowing the pulse width of the scan signal multiplexed as the reset signal in the reset stage T1 may shorten the limit time of one frame, which may be beneficial to realize a high frame rate and further improve the display effect.

The present disclosure also provides a driving method of a pixel driving circuit. As shown in FIG. 2 and FIG. 6, the pixel driving circuit 200 may include a driving transistor M0, a power supply voltage writing module 30, a data writing module 40, a compensation module 50, a light-emitting control module 60, a first reset module 10, a second reset module 20, and a light-emitting element D.

The driving method may at least include a reset stage T1, a data writing stage T2 and a light-emitting stage T3.

In the reset stage T1, the first reset module 10 and the second reset module 20 may be turned on. The first reset module 10 may transmit the first reset signal to the gate of the driving transistor M0 to reset the gate of the driving transistor M0. The second reset module 20 may transmit the second reset signal to the anode of the light-emitting element D to reset the anode of the light-emitting element D.

In the data writing stage T2, the data writing module 30 and the compensation module 50 may be turned on. The data writing module 30 may transmit the data signal provided by the data signal terminal Vdata to the gate of the driving transistor M0, and the compensation module 50 may perform threshold compensation on the driving transistor M0.

In the light-emitting stage T3, the power supply voltage writing module 40 and the light-emitting control module 60 may be turned on. The power supply voltage writing module 40 may transmit the first voltage signal provided by the first power signal line PVDD to the driving transistor M0, and drive the driving transistor M0 to form a current transmitted to the light-emitting element D.

Figure 19:
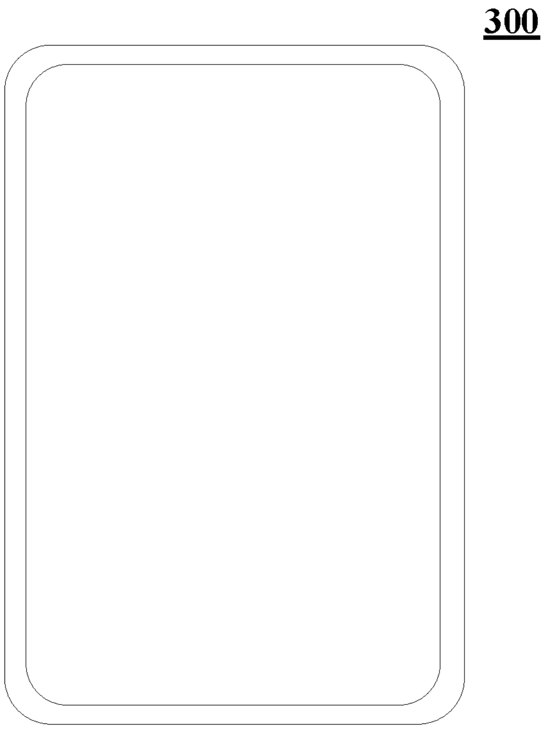
FIG. 19 illustrates a top view of an exemplary display device consistent with various disclosed embodiments of the present disclosure.

The present disclosure also provides a display device. As shown in FIG. 19 which is a top view of a display device provided by one embodiment of the present disclosure, the display device 300 may include a display panel 100 provided by various embodiments of the present disclosure.

The display panel may be a display panel using organic light-emitting diode display technology, that is, an OLED display panel. A basic structure of an OLED display panel may include a hole transport layer, a light-emitting layer, and an electron transport layer. When the power supplies a proper voltage, the holes in the anode and the electrons in the cathode may combine in the light-emitting layer to emit bright light. Compared with liquid crystal display panels, OLED display panels have the characteristics of high visibility and high brightness, and are more power-saving, lighter in weight, and thinner in thickness.

The display device 300 provided by the embodiments of the present disclosure may be any electronic device with a display function, such as a touch screen, a mobile phone, a tablet computer, a notebook computer, an electronic paper book, or a television. The display device 300 provided by the embodiments of the present disclosure may have the beneficial effects of the display panel 100 provided by the embodiments of the present disclosure.

For description purposes only, the embodiment in FIG. 19 where the display device 300 has a rectangular shape is used as an example to illustrate the present disclosure, and does not limit the scope of the present disclosure. In some other embodiments, the display device 300 may have other suitable shapes including rounded rectangle, circle, or oval.

In the display panel and the display device provided by the present disclosure, the input terminal of the first reset signal module may be electrically connected to the scan line or the light-emitting control line, the output terminal may be electrically connected to the gate of the driving transistor. The scan signal provided by the scan line or the light-emitting control signal provided by the light-emitting control line may be multiplexed as the first reset signal. The first scan signal may be transmitted to the gate of the driving transistor through the first reset module to reset the gate of the driving transistor. By multiplexing the scan signal or the light-emitting control signal into the first reset signal, there may be no need to provide additional reset line, saving the wiring space. In a high-density display panel, the problems of small wiring spacing, electric leakage and crosstalk between wirings because of too many wirings are avoided.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising a pixel driving circuit, a scan line and a light-emitting control line connected to the pixel driving circuit, wherein:

the pixel driving circuit includes a driving transistor, a first reset module including a first transistor, a second reset module including a second transistor, and a light-emitting element, wherein an output terminal of the first reset module is connected to a gate of the driving transistor, an output terminal of the driving transistor is electrically connected to the light-emitting element, and an output terminal of the second reset module is directly connected to an anode of the light-emitting element;

an input terminal of the first reset module is connected to the scan line or the light-emitting control line, the scan line including a first scan line and a second scan line;

a scan signal provided by the scan line or a light-emitting control signal provided by the light-emitting control line is multiplexed both as a first reset signal provided by the first reset module to the gate of the driving transistor and as a second reset signal provided by the second reset module to the anode of the light-emitting element, a gate of the first transistor and a gate of the second transistor are connected to a same first scan line that provides a same first scan signal, and an input terminal of the second reset module is directly connected to the light-emitting control line that provides the light-emitting control signal to control transmission of a driving current generated by the driving transistor to the anode of the light-emitting element, the display panel further includes a power supply voltage writing module, a data writing module, a compensation module, a light-emitting control module, and a capacitor;

the power supply voltage writing module includes a third transistor, wherein a gate of the third transistor is connected to the light-emitting control line, a first terminal of the third transistor is connected to a first power signal line, and a second terminal of the third transistor is connected to an input terminal of the driving transistor;

the data writing module includes a fourth transistor, wherein a gate of the fourth transistor is connected to the second scan line, a first terminal of the fourth transistor is connected to a data signal line, and a second terminal of the fourth transistor is connected to the input terminal of the driving transistor;

the compensation module includes a fifth transistor, wherein a gate of the fifth transistor is connected to the second scan line, a first terminal of the fifth transistor is connected to the output terminal of the driving transistor, and a second terminal of the fifth transistor is connected to the gate of the driving transistor;

the light-emitting control module includes a sixth transistor, wherein a gate of the sixth transistor is connected to the light-emitting control line, a first terminal of the sixth transistor is connected to the output terminal of the driving transistor, and a second terminal of the sixth transistor is connected to the anode of the light-emitting element;

the driving transistor, the first transistor, the second transistor, the fourth transistor, and the fifth transistor are P-type transistors;

the third transistor and the sixth transistor are N-type transistors;

a first terminal of the first transistor is connected to the light-emitting control line and a light-emitting control signal provided by the light-emitting control line is multiplexed as a first reset signal provided by the first transistor to the gate of the driving transistor; and a first terminal of the second transistor is connected to the light-emitting control line and the light-emitting control signal provided by the light-emitting control line is multiplexed as a second reset signal provided to the anode of the light-emitting element by the second transistor.

2. The display panel according to claim 1, wherein:

the first scan line provides the first scan signal and the second scan line provides a second scan signal.

3. The display panel according to claim 2, wherein:

the power supply voltage writing module is connected in series between the driving transistor and a first power supply signal line, wherein a control terminal of the power supply voltage writing module is connected to the light-emitting control line, an input terminal of the power supply voltage writing module is connected to the first power supply signal line, and an output terminal of the power supply voltage writing module is connected to the input terminal of the driving transistor;

the data writing module is connected in series between the driving transistor and the data signal line, wherein a control terminal of the data writing module is connected to the second scan line, an input terminal of the data writing module is connected to the data signal line, and an output terminal of the data writing module is connected to the input terminal of the driving transistor;

the compensation module is connected in series between the gate of the driving transistor and the output terminal of the driving transistor, wherein a control terminal of the compensation module is connected to the second scan line, an input terminal of the compensation module is connected to the output terminal of the driving transistor, and an output terminal of the compensation module is connected to the gate of the driving transistor;

the light-emitting control module is connected in series between the driving transistor and the light-emitting element, wherein a control terminal of the light-emitting control module is connected to the light-emitting control line, an input terminal of the light-emitting control module is connected to the output terminal of the driving transistor, and an output terminal of the light-emitting control module is connected to the anode of the light-emitting element; and a first terminal of the capacitor is connected to the first power signal line, and a second terminal of the capacitor is connected to the gate of the driving transistor.

4. The display panel according to claim 2, wherein:

a second terminal of the first transistor is connected to the gate of the driving transistor.

5. The display panel according to claim 2, wherein:

a second terminal of the second transistor is connected to the anode of the light-emitting element.

6. A driving method for driving a pixel driving circuit including a driving transistor, a power supply voltage writing module, a data writing module, a compensation module, a light-emitting control module, a first reset module including a first transistor, a second reset module including a second transistor, and a light-emitting element, the driving method at least comprising a reset stage, a data writing stage, and a light-emitting stage, wherein:

a gate of the first transistor and a gate of the second transistor are connected to a same first scan line that provides a same first scan signal, an input terminal of the second reset module is connected to a light-emitting control line that provides a light-emitting control signal to control transmission of a driving current generated by the driving transistor to an anode of the light-emitting element, and an output terminal of the second reset module is directly connected to the anode of the light-emitting element;

in the reset phase, the first reset module and the second reset module are turned on, the first reset module transmits a first reset signal to a gate of the driving transistor to reset the gate of the driving transistor, and the second reset module transmits a second reset signal to the anode of the light-emitting element to reset the anode of the light-emitting element, wherein a scan signal for controlling the data writing module or the light-emitting control signal for controlling the light-emitting control module is multiplexed as both the first reset signal and the second reset signal;

in the data writing phase, the data writing module and the compensation module are turned on, the data writing module transmits a data signal provided by a data signal terminal to the gate of the driving transistor, and the compensation module performs threshold compensation on the driving transistor; and in the light-emitting phase, the power supply voltage writing module and the light-emitting control module are turned on, the power supply voltage writing module transmits a first voltage signal provided by a first power signal line to the driving transistor, to drive the driving transistor to form a current transmitted to the light-emitting element.

7. A display panel comprising a pixel driving circuit, a scan line and a light-emitting control line connected to the pixel driving circuit, wherein:

the pixel driving circuit includes a driving transistor, a first reset module including a first transistor, a second reset module including a second transistor, and a light-emitting element, wherein an output terminal of the first reset module is connected to a gate of the driving transistor, an output terminal of the driving transistor is electrically connected to the light-emitting element, and an output terminal of the second reset module is directly connected to an anode of the light-emitting element;

an input terminal of the first reset module is connected to the scan line or the light-emitting control line, the scan line including a first scan line and a second scan line:

a scan signal provided by the scan line or a light-emitting control signal provided by the light-emitting control line is multiplexed both as a first reset signal provided by the first reset module to the gate of the driving transistor and as a second reset signal provided by the second reset module to the anode of the light-emitting element, a gate of the first transistor and a gate of the second transistor are connected to the same first scan line that provides a same first scan signal, and an input terminal of the second reset module is directly connected to the light-emitting control line that provides the light-emitting control signal to control transmission of a driving current generated by the driving transistor to the anode of the light-emitting element;

the display panel further includes a power supply voltage writing module, a data writing module, a compensation module, a light-emitting control module, and a capacitor;

the power supply voltage writing module includes a third transistor, wherein a gate of the third transistor is connected to the light-emitting control line, a first terminal of the third transistor is connected to a first power signal line, and a second terminal of the third transistor is connected to an input terminal of the driving transistor;

the data writing module includes a fourth transistor, wherein a gate of the fourth transistor is connected to the second scan line, a first terminal of the fourth transistor is connected to a data signal line, and a second terminal of the fourth transistor is connected to the input terminal of the driving transistor;

the compensation module includes a fifth transistor, wherein a gate of the fifth transistor is connected to the second scan line, a first terminal of the fifth transistor is connected to the output terminal of the driving transistor, and a second terminal of the fifth transistor is connected to the gate of the driving transistor;

the light-emitting control module includes a sixth transistor, wherein a gate of the sixth transistor is connected to the light-emitting control line, a first terminal of the sixth transistor is connected to the output terminal of the driving transistor, and a second terminal of the sixth transistor is connected to the anode of the light-emitting element;

the driving transistor, the first transistor, the second transistor, the third transistor, the fourth transistor, the fifth transistor, and the sixth transistor are N-type transistors;

a first terminal of the first transistor is connected to the first scan line and the first scan signal provided by the first scan line is multiplexed as the first reset signal provided by the first transistor to the gate of the driving transistor; and a first terminal of the second transistor is connected to the light-emitting control line and the light-emitting control signal provided by the light-emitting control line is multiplexed as the second reset signal provided to the anode of the light-emitting element by the second transistor.

8. A display device, comprising a display panel, wherein:

the display panel includes a pixel driving circuit, a scan line, and a light-emitting control line connected to the pixel driving circuit;

the pixel driving circuit includes a driving transistor, a first reset module including a first transistor, a second reset module including a first transistor, and a light-emitting element, wherein an output terminal of the first reset module is connected to a gate of the driving transistor, an output terminal of the driving transistor is electrically connected to the light-emitting element, and an output terminal of the second reset module is directly connected to an anode of the light-emitting element;

an input terminal of the first reset module is connected to the scan line or the light-emitting control line, the scan line including a first scan line and a second scan line;

a scan signal provided by the scan line or a light-emitting control signal provided by the light-emitting control line is multiplexed both as a first reset signal provided by the first reset module to the gate of the driving transistor and as a second reset signal provided by the second reset module to the anode of the light-emitting element, a gate of the first transistor and a gate of the second transistor are connected to a same first scan line that provides a same first scan signal, and an input terminal of the second reset module is directly connected to the light-emitting control line that provides the light-emitting control signal to control transmission of a driving current generated by the driving transistor to the anode of the light-emitting element;

the display panel further includes a power supply voltage writing module, a data writing module, a compensation module, a light-emitting control module, and a capacitor;

the power supply voltage writing module includes a third transistor, wherein a gate of the third transistor is connected to the light-emitting control line, a first terminal of the third transistor is connected to a first power signal line, and a second terminal of the third transistor is connected to an input terminal of the driving transistor;

the data writing module includes a fourth transistor, wherein a gate of the fourth transistor is connected to the second scan line, a first terminal of the fourth transistor is connected to a data signal line, and a second terminal of the fourth transistor is connected to the input terminal of the driving transistor;

the compensation module includes a fifth transistor, wherein a gate of the fifth transistor is connected to the second scan line, a first terminal of the fifth transistor is connected to the output terminal of the driving transistor, and a second terminal of the fifth transistor is connected to the gate of the driving transistor;

the light-emitting control module includes a sixth transistor, wherein a gate of the sixth transistor is connected to the light-emitting control line, a first terminal of the sixth transistor is connected to the output terminal of the driving transistor, and a second terminal of the sixth transistor is connected to the anode of the light-emitting element;

the driving transistor, the first transistor, the second transistor, the fourth transistor, and the fifth transistor are P-type transistors;

the third transistor and the sixth transistor are N-type transistors;

a first terminal of the first transistor is connected to the light-emitting control line and a light-emitting control signal provided by the light-emitting control line is multiplexed as a first reset signal provided by the first transistor to the gate of the driving transistor; and a first terminal of the second transistor is connected to the light-emitting control line and the light-emitting control signal provided by the light-emitting control line is multiplexed as a second reset signal provided to the anode of the light-emitting element by the second transistor.

* * * * *